Dec. 5, 1933.  F. A. HAYES  1,937,697
FRICTION TRANSMISSION CONTROL DEVICE
Filed Nov. 29, 1930  4 Sheets-Sheet 3

INVENTOR.
FRANK A. HAYES
BY
ATTORNEY.

Dec. 5, 1933.　　　　F. A. HAYES　　　　1,937,697
FRICTION TRANSMISSION CONTROL DEVICE
Filed Nov. 29, 1930　　　4 Sheets-Sheet 4

INVENTOR.
FRANK A. HAYES
BY
ATTORNEY.

Patented Dec. 5, 1933

1,937,697

UNITED STATES PATENT OFFICE 1,937,697

FRICTION TRANSMISSION CONTROL DEVICE

Frank A. Hayes, Middletown, N. J.

Application November 29, 1930
Serial No. 499,021

32 Claims. (Cl. 74—34)

This invention relates to apparatus for driving a load from a power means, and although not limited to use in the automotive field it finds especially advantageous application in motor vehicles for transmitting the power of the engine to the driving wheels. In its preferred form the invention is embodied in a transmission mechanism of the friction type having toroidally grooved disks and cooperating rollers, for example transmission and fluid-pressure control mechanisms of the types described and claimed broadly in my copending application Serial No. 361,031, and I have accordingly illustrated such an embodiment in the accompanying drawings.

In the preferred embodiment shown in the drawings, the transmission is particularly adapted to be used to drive motor vehicles as between the engine and rear axle, and to provide automatic regulation of the speed ratio of the mechanism dependent upon the speed of the engine and the resistance encountered, so that all the driver has to do to start the vehicle is to open the engine throttle and thereafter the speed maintained by the vehicle will depend upon the amount of throttle opening and the road resistance.

Such a transmission may consist primarily of three elements, a driving friction element which may be a disk element, a driven friction element which may be either a roller element or the remaining disk element, and a stationary element which is the remaining friction element. Reverse may be obtained by interchanging the stationary and driven elements. Such an interchange may be effected by using jaw or friction clutches, or both. Where both are used this interchange is partly made by shifting the jaw clutch or clutches into or out of mesh and then starting the car with the friction clutch or clutches.

One of the objects of this invention is to provide a shift which has associated with it little or no inertia so as to make the shift easy and quick in operation and to prevent jerking the vehicle while so shifting, and a further object is to operate this reverse shift hydraulically under the control of the operator.

Another object of the invention is to provide fluid pressure actuated or controlled means for starting the load (say an automobile) said starting means being preferably connected with the accelerator pedal in a manner so that the initial depression of said pedal prior to the opening of the throttle will render the starting means effective.

A further object of this invention is to provide for using the transmission as a braking means by causing it to drive the engine at varying speeds from the car and without overloading the transmission or causing objectionable shocks to passengers, and to provide a suitable control by which the driver may apply such braking effects.

The transmission shown in the drawings is provided with an automatic direct drive and a further object of this invention is to provide easy and rapid means for changing out of direct drive and holding the drive through the transmission elements at the option of the operator and irrespective of any adjustment that may be provided for automatic action.

Various other objects and advantages of the invention will be in part obvious from an inspection of the accompanying drawings and a careful consideration of the following particular description of one form of mechanism embodying my invention.

With reference to drawings, the driving disks 10 and 11 are keyed to the driving shaft 12 and are provided on their inner faces with toroidal grooves 13, 14, that is, annular grooves of circular cross section, and between the two disks is a sleeve 15 rotatable on the shaft. The intermediate disk 17 is rotatable on the sleeve 15 and is provided on its two faces with toroidal grooves 18, 19 of the same radius of curvature as grooves 13, 14. Between the outer disks and the inner disk there are disposed a plurality of friction rollers 20 which drivably engage the toroidal grooves, said rollers being mounted in the manner hereinafter to be described. Assuming that the shaft 12 is operated by a prime mover in the direction indicated by the arrow thereon it will be seen that the two outer disks will be rotated with the shaft in the same direction, and the inner disk 17, in the opposite direction.

Figure 1:
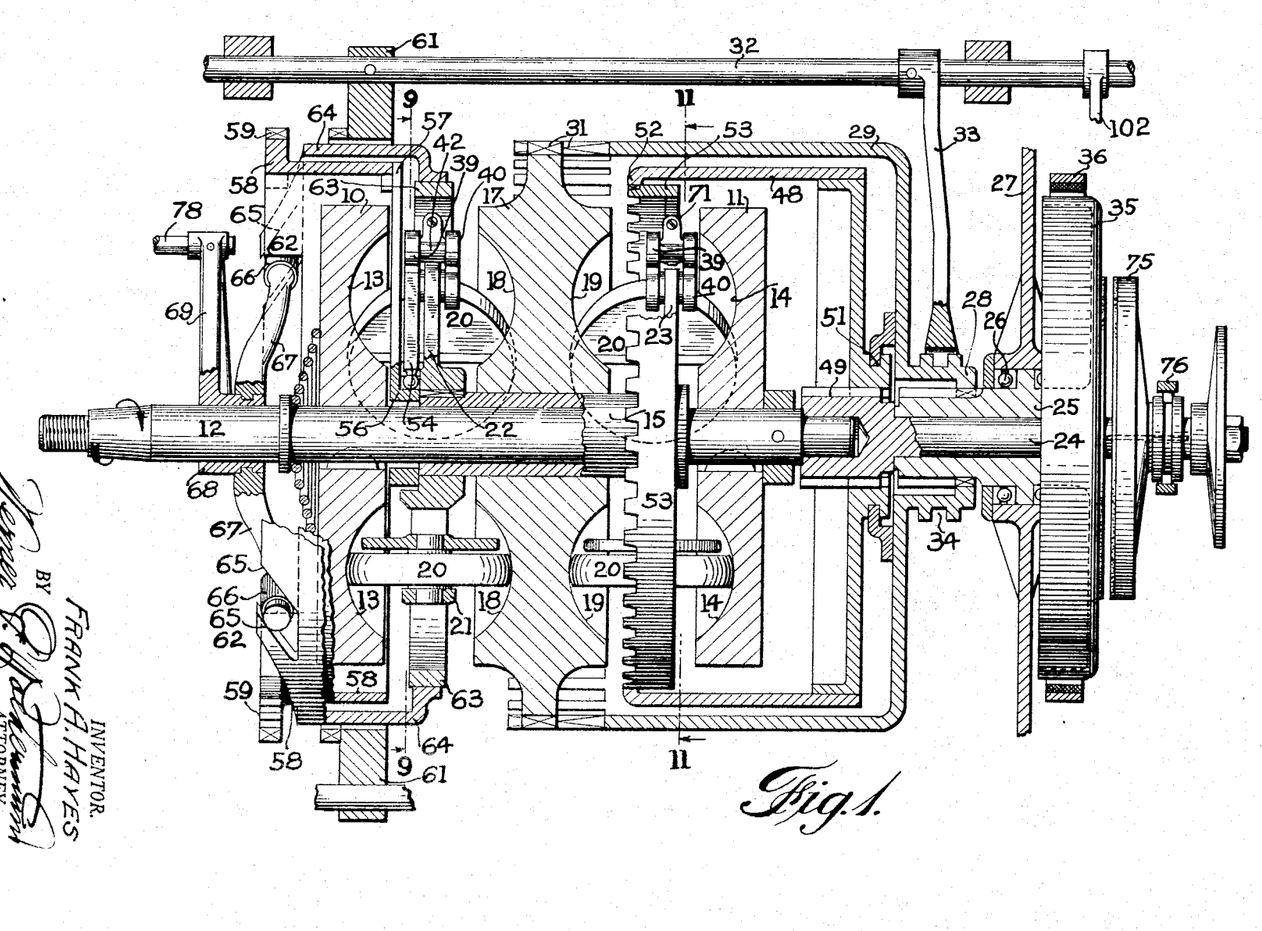
Figure 1 is a vertical longitudinal section of the transmission portion of the present invention.

The shaft 12 is shown in Fig. 1 as journaled in the end of the coaxial driven shaft 24, which rotates in a collar or sleeve 25, said collar being rotatable in a thrust bearing 26 in the rear wall of the transmission casing 27. Splined to this sleeve 25 is the hub 28 of a drum 29, said drum extending towards the disk 17 to which it is drivably connected by the splines 31 so that the drum may be axially shifted relative to the disk without disengagement therewith, by a control rod 32 and an arm 33, said arm engaging an annular groove 34 formed on the hub. Fixed on the sleeve 25 exteriorly of the housing 27 is a brake drum 35 encircled by a frictionally engaging band 36 which may be actuated manually, but preferably by a fluid pressure means hereinafter described so that the disk 17 may be arrested to prevent the rotation thereof.

The friction rollers 20 are mounted in carriers 21 (Figs. 9, 10 and 11) said carriers being carried by the spiders 22 and 23 so as to be capable of rocking on axes perpendicular to the respective roller axes and adapted to be shifted (longitudinally of the axes on which they rock) in such a manner as to cause the rollers to "precess", i. e., to be angularly displaced, from a low speed position towards high speed and vice versa, as described in detail in my Patent No. 1,698,229 and in my copending application Serial No. 361,031 filed May 7, 1929. This precession or angular displacement of the rollers is the result of a certain degree of side thrust imposed thereon (by the rotation of the disks) across the plane of the roller at the point of contact when the axes of the rollers are moved out of the plane of the disk axis. These spiders 22 and 23 are mounted to rotate with the sleeve 15 and comprise three arms spaced 120 degrees apart. Pivoted at 38 on each of said arms is a rocker composed of a front plate 39 and a rear plate 40 connected by webs 42 and spaced to straddle the spider arms. In the side edges of the rockers are recesses 43 to receive the trunnions of a block 44 in which the journals 46 of the roller carriers 21 are mounted by means of the screw threads 47 the function of which is fully described in the above mentioned patent.

Figures 9, 10, 11:
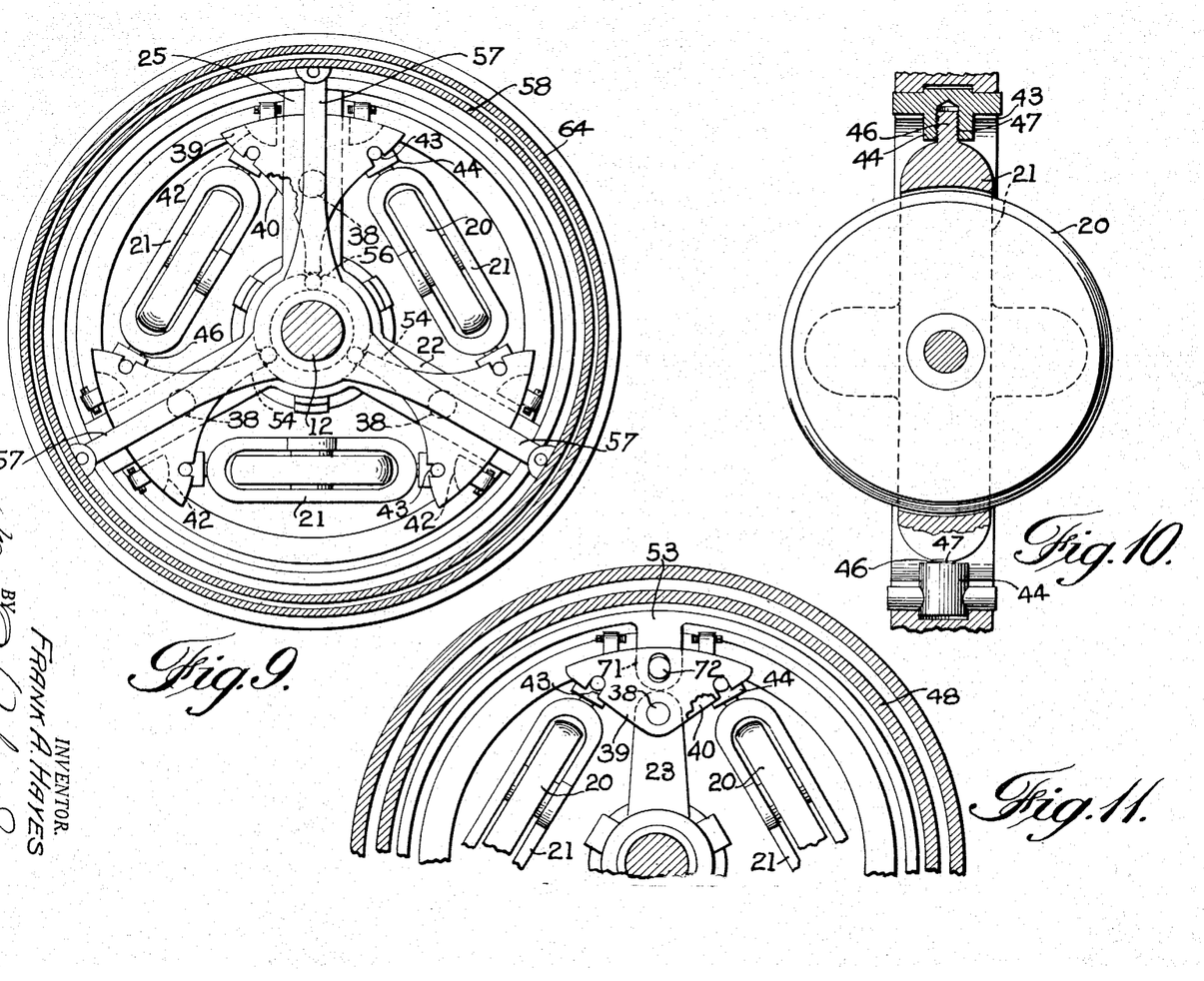
Figure 9 is a cross section taken on the line 9—9 of Fig. 1.
Figure 10 is a section of a roller carrier on an enlarged scale showing details of construction.
Figure 11 is a fragmentary section taken on the line 11—11 of Fig. 1.

The roller carriers are thus supported in the plane of the spider and between the arms thereof. The front rocker-plates 39 are provided with fingers 54 extending radially inward and equipped with ball ends engaging suitable recesses in a ring 56 loosely encircling the shaft 12. Now, if the ring 56 is given a slight rotary movement in one direction, the fingers 54 will be rocked in the opposite direction, thereby tilting the rocker-plates 39, 40 on their pivots 38 which will result in shifting of the roller carriers in a direction opposite to the movement of said ring 56 with consequent precession (or rocking) of the roller carriers in their trunnion blocks 44.

To produce the slight rotation of the ring 56 as described, the ring is provided with three radial arms 57 extending outwardly into connection with a drum-shaped annulus 58 provided on its periphery with clutch teeth 59 which extend only a limited distance circumferentially so as to be engageable by similar clutch teeth formed on an annulus or clutch ring 61 which is axially shiftable by the control rod 32 simultaneously with the axial movement of the drum 29. The annulus 58 is also provided with cam edges 62, and, on a ring 63 carried by the spider arms 22, there is a similar annulus 64 encircling the annulus 58, which is provided with relatively angular cam edges 65. Co-operating with the aforesaid cam edges are two rollers 66 carried by radially extended arms 67 which are connected to a hub 68 of an arm 69 for relative rotation thereon. The arm 69, hub 68, and arms 67 are axially movable as a unit, but the arm 69 and its hub are not rotatable whilst the arms 67 are. Hence when the hub 68 is axially shifted towards the right (Fig. 1) the annulus 58 will be rotated clockwise relatively to the annulus 64 and if the hub is shifted towards the left the rotation of the annulus 58 will be counterclockwise. In this way the ring 56 is given the slight rotary movement desired to shift the roller carriers, with resulting precession of the rollers and consequent change of speed ratios. It will be observed that the described movement of the arms 67 (or the control in general) can shift the roller carriers both towards a high and a low speed ratio since the action of the cams 65 is effective in two directions, the frictional resistance opposing the transmission of power causing the drum or annulus 64 to follow the backward (i. e., backward) movement of the arms 67.

The second set of planetary rollers which are disposed between the disks 17 and 11 are mounted in the spider 23 (also rotatable with the sleeve 15) in a manner similar to the aforementioned set. However, the rockers 39, 40 (Fig. 11) in this instance are devoid of the radial fingers, and instead there has been provided an annulus 53 (previously mentioned) which has inwardly extending ears 71 that are provided with pins 72 operating in radial slots of the rocker plates. It will be readily understood that relative rotation between the ring 53 and the spider 23 on which the rockers are pivoted will result in a tilting of the rockers, thereby shifting the roller carriers and causing precession of the rollers as described in connection with the first set of rollers. The necessary relative rotation of the ring and spider, to cause shifting of the rollers and precession thereof in harmony with the rollers of the first set, automatically follows the shifting of the rollers of the first set, as will be explained hereinafter. Since the first set is the one which is adjusted at will to control or vary the speed ratio of the mechanism, it is for convenience, designated as the "control set". Since the supporting spiders 22 and 23 are both rigidly connected to the same sleeve 15 the two sets must operate in unison, both revolving in planetary fashion or both remaining stationary at the same time. Hence in the construction illustrated the two may be considered as together constituting a roller element.

The friction rollers 20 are by means of their spiders connected to the driven shaft 24 by a drum 48 which is slidably splined to the driven shaft at 49 and rotatably connected to the drum 29 at 51.

The two drums 29 and 48 are thus adapted to be shifted simultaneously by the shift rod 32 but can freely rotate independently of each other.

The drum 48 is provided with clutch teeth 52 which can be moved into or out of engagement with similar teeth formed on the annulus 53, so that the drum can revolve (with the planetary rollers 20, 21, and sleeve 15) to drive the driven shaft 24.

Assuming that the brake band 36 is released and the intermediate disk 17 free to rotate, and that the friction rollers are connected to the driven shaft 24 by the driving connection just described, it will be seen that rotation of the driving disks 10, 11 in the direction of the arrow on the shaft 12 will cause the middle disk 17 to rotate in the opposite direction. If now the brake band 36 is tightened somewhat on the drum 35, the rotating disk 17 will slow down and the planetary rollers will begin to revolve, thereby starting the load into motion. As the brake band is further tightened the middle disk is brought to rest, and the planetary rollers then drive the load at the "speed" to which the rollers have been set by the precession already described. It will be readily seen that the reaction of the load on the driven shaft is taken by the disk 17 which may therefore be conveniently termed a reaction element.

Splined on the outer end of the driven member or shaft 24 is a clutch member disk 75 which may be shifted into and out of engagement with the drum 35 by a fork 76. It will be seen that when this clutch disk is engaged with the drum and the brake band 36 is released to permit the drum 35 and the middle disk 17 to rotate, the driven shaft 24 is then coupled to the sleeve 25 to which the drum 29 is splined. The drum 29 being in engagement with the disk 17 by means of the splines 31, and the drum 48 which is splined to the driven shaft being similarly clutched to the ring 53, the driven shaft is thus connected both to the planetary rollers and to the disk 17. Hence, in the absence of slippage between the driving disks 10, 11 and the rollers, the three disks and the interposed rollers must revolve as a unit at the same speed as the driving disks and driving member or shaft, and with them the driven shaft 24. This gives "direct drive".

As so far described the rotation of the driven member or shaft 24 is in the same direction as that of the driving shaft 12. Now, in order to obtain reverse, the driven shaft 24 being at rest, and disk 17 rotating in the reverse direction as previously described, rod 32 is shifted forward (leftwardly in Fig. 1) thereby shifting leftwardly drums 29 and 48 and the non-rotatable member clutch ring 61 which is attached to rod 32 by a pin as shown.

Drum 48 now goes out of mesh with the toothed annulus 53, leaving driven shaft 24 free to rotate, and at the same time brake ring 61 engages teeth 59 on control drum 58 (this or any other member attached to or rotating with the rollers may be used) thus holding the roller assembly from revolving in planetary fashion. Since the roller assembly (rollers, carriers and spiders) is already stationary at the time of this shift (on the assumption that the driven shaft 24 and with it the vehicle is stationary), it will be evident that no change in inertia is involved and that the shift will therefore be quiet and free from shock and may be made at any speed of the driving shaft 12. In making this shift the parts 48 and 53 disengage before the clutch ring 61 and control drum 58 engage, and a neutral position may be provided in which there will be no relative movement of the rollers and disk. This neutral position is used only for starting or turning the engine or other similar purpose, otherwise it is not used at all, the shift either into or out of reverse being completed in a single quick operation without any pause being necessary to avoid noise and burring of teeth as in the conventional gear shift. With the shift into reverse completed as above described, the driven shaft is free from connection and with the rollers, the latter being prevented from planetary revolution by the non-rotatable brake ring 61. To reverse the vehicle it is now only necessary to apply the friction clutch 75 to drum 35. This may be done manually but I prefer automatic means dependent upon the speed of the engine so that in reverse as well as in forward drive, all the driver has to do is to step on the engine accelerator as hereinafter described.

It should be noted that while the direction of rotation opposite to that indicated on the drive shaft 12 has been designated as reverse, the contrary may be true in the case where the rollers are operated in planetary fashion for reverse. This will give a wider range of speed ratio but in the specific construction illustrated herein it eliminates the possibility of using direct drive.

For actuating the various controls I prefer to use fluid pressure devices. Hydraulic devices, using oil as the pressure liquid, are especially convenient, as the oil required for lubrication of the mechanism can be utilized for the purpose, suitable pressure being obtained by a pump actuated by the transmission mechanism or the engine or other prime mover which drives the mechanism. I also prefer, especially when the mechanism is used in an automobile between the engine and the driving wheels of the car, to make the operation of the control devices dependent upon the pressure of the oil and to make the oil pressure in turn dependent upon the speed of the engine. Then so far as the driver of the car is concerned all he needs to do to start the car (assuming the engine idling) is to open the throttle slightly. Thereafter, varying the throttle opening will automatically bring about the proper changes of speed ratio, while to stop the car he merely closes the throttle to idling speed and applies the brakes. Putting the transmission mechanism in reverse is then the only operation that does not follow automatically upon appropriate change of throttle opening. Control mechanism having the operation described is illustrated in Figs. 2 to 8 to which reference is now made.

Figures 2, 4:
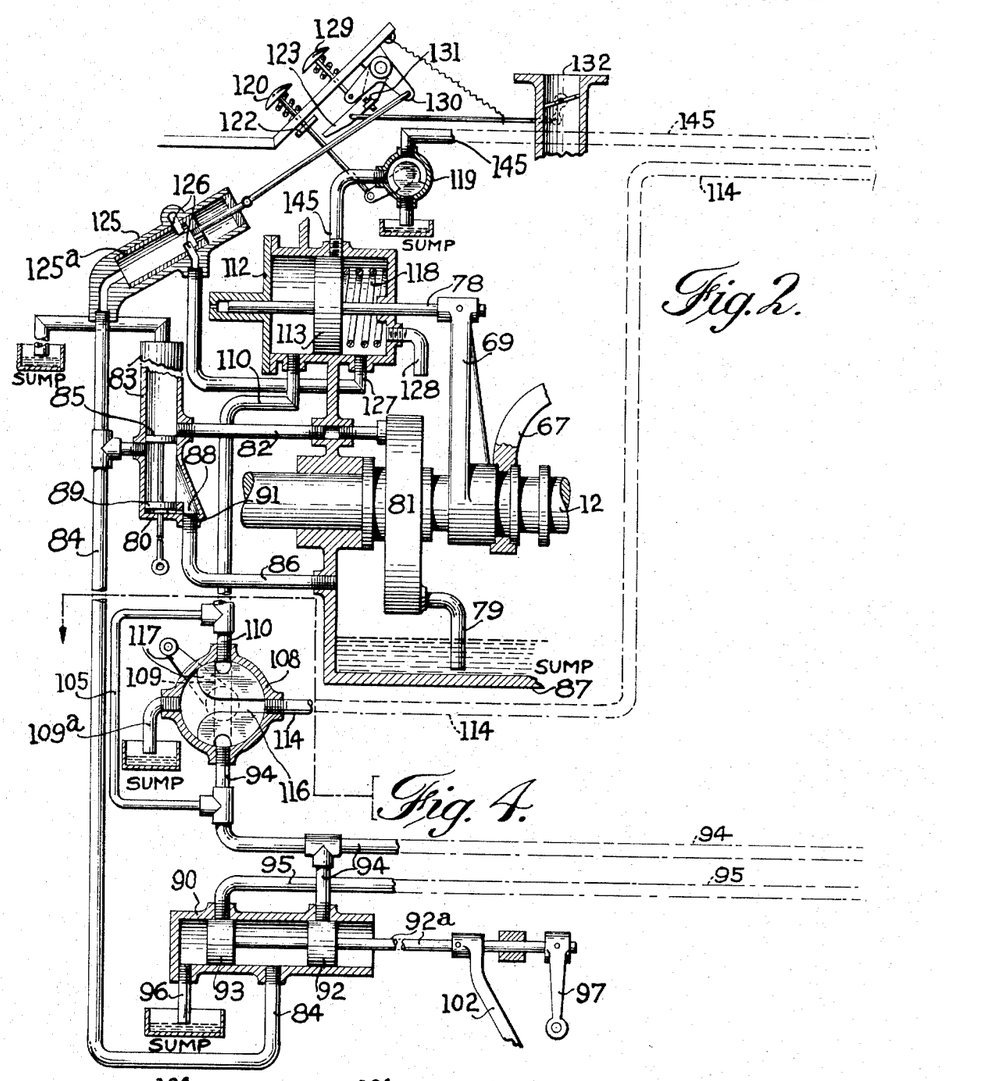
Figures 2, 3, 4 and 5 are diagrammatic illustrations, largely in section, of the hydraulic control devices by which the speed changes are brought about, the various units being arranged for the sake of clearness in the same plane, and the piping by which the various parts are connected being shown in dotted lines extending from one figure to another.

Referring to Fig. 2, oil under the necessary pressure is supplied by a pump 81, which may be of the gear type, having an intake pipe 79 leading from the oil pump in the transmission housing or case 27, and having a delivery pipe 82 connected to a control valve 80 which may be located at any convenient point inside or outside the housing, but the handle by which the valve is set should, in general, be accessible, though as will be seen later the valve does not require manipulation as a control, being merely set to suit the idling speed of the engine, the character of the oil used, etc. The oil pump, preferably driven directly from the driving shaft 12, is mounted in any convenient position, as for example at the forward end of the driving shaft 12 inside the housing. In the present embodiment of the invention the pump is driven at a speed directly proportional to the engine speed, so that the higher the engine speed the greater will be the pressure delivered. Oil from the pump 81 is delivered to other parts of the control mechanism by pipes 84 and 95, shown at the left of Fig. 2 and shown also in Figs. 3 and 4.

The control valve 80, Fig. 2, has a neutral or off position in which it is shown in the drawings, and in this position, oil from pump 81 passes through pipe 82 to the upper portion of the valve casing 83 from which it returns to the sump, it being as shown completely disconnected from pipe 84 by piston 85. Pipe 84 supplies oil to the various hydraulic devices, whilst at the same time oil from pipe 84 can escape between the two pistons of the control valve 80 through the port 88 to pipe 86 which is wide open at this point. This neutral position makes it possible to race the engine without any possibility of starting the vehicle, or to coast at high speed. Control valve 80 should in general be set to this position if the car is left standing without an operator. In the running position, this valve is set so that the upper piston 85 is above the opening for pipe 82 so as to connect pipes 82 and 84 together (between the two pistons of the valve) and also connect them to the drain 86 from which the oil flows back to the sump 87.

The port 88 in the control or idling valve 80 is elongated and made of suitable shape to effect a gradual change in area as the pistons of the control valve are raised until in the upper position. The pipe 86 may thus be entirely closed against the flow of fluid if desired. It will be noticed that all fluid pressure on valve 80 is balanced, which makes it easy to operate and set. A drain 91 is provided, leading to pipe 86 to prevent leakage around the stem which may of course be suitably packed if necessary. By adjusting the opening of port 88 by means of piston 89, the speed at which the various operating functions occur, notably direct drive, may be determined by the operator. From the foregoing it will be seen that in the specific mechanism illustrated the valve 80 serves to determine the engine-speed at which the brake band 36 is applied to start the car. When the valve is in the position shown, with the port 88 open, the engine throttle can be opened to its fullest extent without starting the car. Similarly, if after the car is started the valve be returned to the position shown the engine at once ceases to drive the car at any throttle opening, assuming, of course, that the port 88, when opened, has sufficient capacity. In the first case the rollers do not revolve, but, acting like non-planetary rollers, merely spin the intermediate reaction element or disk idly. In the second case the movement of the car revolves the rollers in the planetary manner, the reaction disk (no longer held stationary by the brake band 36) rotating at proportionate speed.

An arm 69 (Figs. 1 and 2) actuates the mechanism by which the transmission rollers are displaced in a manner as to cause precession and consequent change of speed ratio, said arm being connected by the rod 78 to a piston 113 urged leftwardly by spring 118 in a cylinder 112 to which oil under pressure is supplied by a pipe 110. The piston also controls communication between the cylinder and pipes 145 and 127 connected to either side of the piston. The cylinder may be carried by the front end of the case or housing 27, as indicated in Fig. 2.

The brake band 36 (Figs. 1 and 3), by which the middle disk or reaction element 17 is arrested as described above, is tightened by the movement of the hollow piston rods 160, 161, having flanges 141, 155 co-operating with lugs on the band 36 and also serving to limit the leftward and rightward movements of the rods in the fixed guide stops 162, 163. The two rods are connected to two axially spaced apart pistons 137, 138, in a cylinder 115, to which oil under pressure may be admitted at a point between the pistons by a pipe 134 through a port 136 in the skirt of piston 138. The band 36 is released by an expansion spring 139 inserted between the lugs on the ends of the band. Between piston 138 and the adjacent cylinder head there is a spring 140. Piston 138 also controls the cylinder port to which pipe 114 is connected. Delivery of oil to the cylinder through pipe 134 is controlled by a differential valve 133, itself controlled by a piston 150 in a cylinder 143 which is connected to pipe 145 which cylinder is also connected by pipe 144 to the rear end of the brake cylinder 115. It will be seen that in the absence of countervailing pressure in said valve cylinder, oil under pressure in pipe 94 will open valve 133 and pass thence through pipe 134 to the brake cylinder 115, thereby applying the brake band 36 to the brake drum 35.

Figure 3:
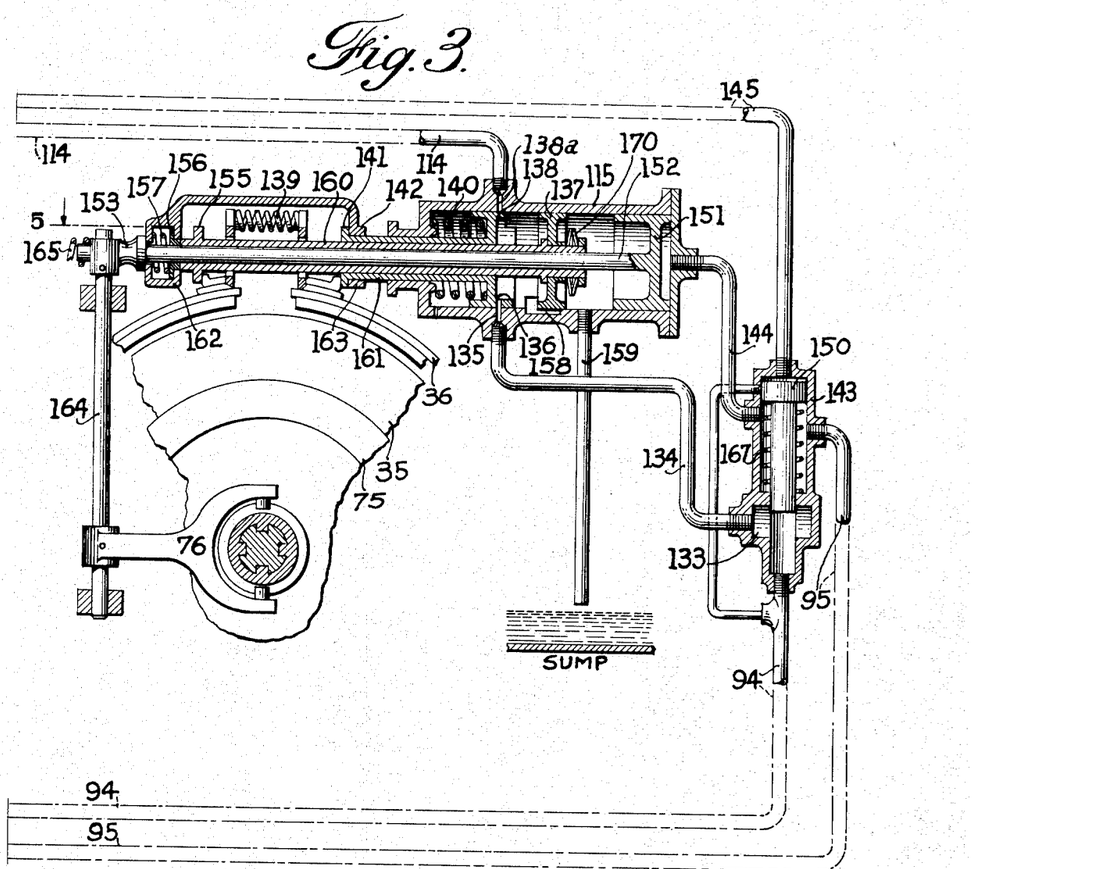
Figure 5:
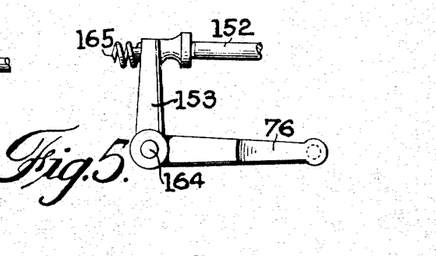

The fork 76 which actuates the direct drive clutch 75, Figs. 1, 3 and 5, is itself actuated to engage the clutch with the drum 35 by advance (leftward movement) of a piston rod 152 acting through the bell crank 153 fixed on a rock shaft 164 to which the fork 76 is also fixed. To release the clutch as the piston rod moves rightwardly a spring 165, Figs. 3 and 5, may be provided. The rod 152 extends through the hollow rod 160 and is actuated to apply the clutch disk to drum 35 by a piston 151.

With reference to Fig. 4, the shift rod 92a operates a reverse shift piston valve 90 provided with connected pistons 92 and 93 fixed to said rod. This valve is shown in the neutral or off position, in which pipe 84 is cut off from 94 and 95. For forward shift, rod 92a and pistons 92 and 93 are moved rightwardly, connecting pressure pipe 84 to 94 and pipe 95 to the sump through drain pipe 96. For reverse, the shift rod 92a is moved leftwardly, connecting pressure pipe 84 to 95 and connecting pipe 94 to the sump through the open rightward end of the valve casing which may be part of the transmission housing. Rod 92a may be shifted manually in any desired manner as by an arm 97. Shift rod 32, Fig. 1, and shift rod 92a, Fig. 4, are connected by arm 102 so as to be shifted simultaneously by arm 97 just mentioned.

Figure 6:
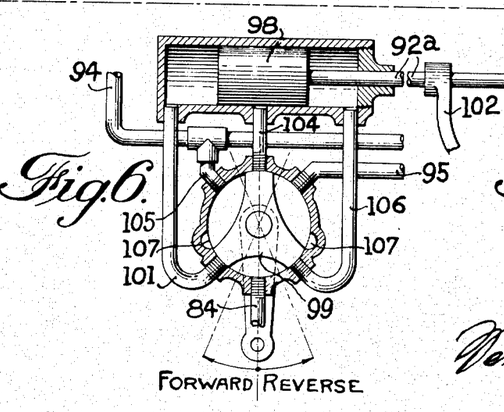
Figure 6 is a sectional view of a fluid control device suggested as an alternative for the one shown in Fig. 4.
Figure 7:
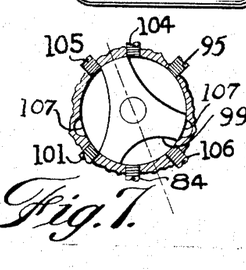
Figures 7 and 8 are fragmentary sections of the control device shown in Fig. 6 and illustrate the moved positions of control element therein.
Figure 8:
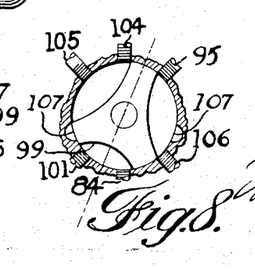

In Fig. 6 there is shown an alternative method for accomplishing the reverse shift, and in this figure the shift is accomplished by hydraulic means. Rod 92a is shifted by a piston 98 under the control of a rotatable valve 99, itself under the control of the operator and located at any convenient place.

Any suitable form of valve may be used but for simplicity a three port cock is shown. When the valve rotor 99 is turned clockwise it connects pipe 84 to 101 (Fig. 8) which supplies oil under pressure to move piston 98 rightwardly thus shifting to the forward position. On completion of its stroke, piston 98 uncovers pipe 104 from which oil flows through the valve to pipe 105 and thence to 94. For reverse, the valve is turned in the opposite direction i. e., counterclockwise (Fig. 7) under which condition oil from pipe 84 enters 106, moves piston 98 leftwardly which again uncovers pipe 104 from which oil then flows through the valve to 95. Drain ports 107 on either side provide escapes for the oil from the appropriate side of the piston.

It will be seen that when the reverse valve 92—

93, Fig. 4, is in its leftward or reverse position (moved thereto manually by means of arm 97) the motion of the intermediate disk, which is then being rotated by the rollers without planetary revolution of the latter, is communicated to the driven shaft 24 through the medium of clutch 75, Figs. 1 and 3, the clutch being applied to brake drum 35 by liquid through pipe 95, valve cylinder 143, and pipe 144 to cylinder 115, thereby advancing piston 151 and rod 152.

Figure 4 also shows a rotatable valve 108 designated as a braking valve which is under the control of the operator and is employed when it is desired to use the engine as a braking means. In the off position as shown in the figure, oil passes from pipe 94 through a passage 109 of the valve rotor 117 to pipe 110 and thence to control cylinder 112 to actuate the control piston 113. In the same position of the valve, relief port 138a in cylinder 115 is connected by pipe 114 through the braking valve 108 to the sump by means of passage 116. To use the engine as a brake (the transmission not being in direct drive) the operator moves the rotor 117 of this valve 108 clockwise in the figure thus first cutting off pipe 114, preventing escape of oil from cylinder 115 through pipe 114, and thereby preventing the automatic release of brake band 36 and application of clutch 75 to drum 35 which might otherwise occur if the engine is speeded up. Further clockwise movement of the rotor opens pipe 110 to drain 109a thus relieving the pressure in cylinder 112 and allowing piston 113 to move leftwardly under the action of spring 118 and thus cause the transmission to change down toward the low speed position, thereby causing the car to drive the engine faster and faster and accordingly the engine will act as a more and more severe brake. If the transmission is operating on direct drive when valve 108 is turned, the described leftward movement of the control piston 113 opens pipe 145, whereupon the pressure on differential valve piston 150 is relieved and the mechanism goes out of direct drive.

A speed reduction valve 119 is also provided to be operated manually, or by a foot button 120, which latter may be conveniently located for actuation by the left foot of the driver. The purpose of this valve is to disable the direct drive mechanism (by permitting escape of oil from pipe 145 to the sump) and thus cause the transmission to change down out of direct drive at the option of the operator at any time, without waiting for the automatic change-down due to reduced engine speed, and without disturbing the adjustment provided by valve 80 for automatic action or disturbing the automatic adjustment of the rollers below the ratio at which the mechanism goes into direct drive. The same valve may be used to keep the transmission on its lower speed ratios longer when starting, etc. Button 120 may also be used when making a sudden stop of the car to prevent stalling the engine by giving it a slight additional amount of throttle opening over the usual idling allowance. For this purpose a collar 122 is provided on the rod of button 120 to engage lever 123 near the end of the downward movement of the button and thus open throttle 132. Any convenient form of adjustment (not shown) may be provided for the collar, as by screwing it on the rod of the button 120 in various positions.

Other features of the hydraulic control will be described more particularly in describing its action.

With reference again to valve 80 a convenient place to put the operating connection for this valve is on the steering wheel with a lever similar to the spark and throttle levers of conventional construction, and the valve lever may be provided with a quadrant marked in any suitable manner, for example to indicate the speed at which the transmission will go into direct drive with warm oil and full throttle.

Suppose now that the car is standing with shift rod 32 set in forward drive (i. e. rightward) position, engine idling and control valve 80 set (raised) for any convenient speed, say 15 miles per hour. As before explained the reaction element or disk 17 and drum 35 will be rotating slowly in the reverse direction relative to the driving disks 10, 11 under the action of the latter disks and the friction rollers. The oil delivered by pump 81 flows through pipe 82 to valve 80 where it divides, part of it going through the port 88 in valve 80 (assuming that this port is open) and the remainder (neglecting leakage) going through pipe 84 to the starting valve cylinder 125, which is open, and where it enters the inside of the hollow sleeve 125a and flows out through the narrow ports 126 in this sleeve, which register with corresponding narrow ports in the cylinder, to pipe 127, thence to control cylinder 112 where it enters to the right of piston 113 and escapes to the sump through port 128. Hence there is no pressure delivered to the various controlling devices and control valve 80 may, if desired be set by the operator in any desired position without starting the car, even though the engine is idling fast. (It will be seen that valve 125 serves to relieve the pressure delivered by the pump. Speed control piston 113 and cylinder 112, by which communication between pipes 127 and 128 is controlled, serve as an automatic pressure relief valve in series with valve 125. Thus, as the piston moves toward the right the speed ratio of the transmission mechanism increases, and at a predetermined ratio position the piston closes pipe 127. Thereafter, escape of oil from pipe 84 through valve 125 and pipe 127 is prevented even though valve 125 be open, that is, with ports 126 in register with the ports in the valve cylinder. In other words, the pressure relief valve 125 can be effective to relieve the oil pressure only within the speed ratio range which lies below the position of piston 133 at which pipe 127 is closed.)

The operator now steps on accelerator button 129 as in operating any car but with both hands free for steering and no thought for gear shift levers or clutch. The first action of button 129 is to rock bell crank 130 as far as stop 131 thus advancing the sleeve 125a in the starting valve 125 and thereby closing the ports 126, so that the oil pressure is no longer relieved by way of pipes 127 and 128. This may or may not cause the car to start, depending upon the idling speed and the setting of control valve 80. Further movement of accelerator button 129 engages lever 123 through stop 131 and opens throttle 132 thus speeding up the engine. This action pumps more oil than control valve 80 can pass through port 88 and oil then flows through pipe 84 to shift valve 92, 93 (Fig. 4) to pipe 94, valve 92 being in the forward position, i. e., at the right of the orifice of pipe 94. Here it divides, part of it going through brake valve 108 and pipe 110 to control cylinder 112 where it tends to move piston 113 rightwardly and thus change the transmission into higher speed by means of the control arms 69, and 67. The other outlet for the oil is rightwardly along pipe 94 to differential valve 133 (Fig. 3) to pipe 134 to port 135 through the skirt of piston 138 at 136 and into cylinder 115 between pistons 138 and 137, where it tends to force the pistons apart against spring 139 and thus contract brake band 36 on drum 35 and stop it from rotating, which action will start the car. Actually, piston 137 does all the work as piston 138 is subjected to the load of spring 140 as well as 139 while the only resistance to motion of piston 137 (neglecting friction) is spring 139. As band 36 tightens on drum 35, the load reaction also tends to keep the tappet or collar 141 against stop 142 and thus prevent piston 138 from moving. Between the head of the piston 137 and the right hand extremity of its hollow stem 160, there has been introduced a spring element 170 which permits a slight yielding movement of the piston head relative to its stem for the purpose of providing a certain degree of a yielding pressure of the tappet or collar 155 upon the lug of the brake band 36, so as to insure smooth starting under all conditions. Up to the time the band 36 closes on the drum, the oil pressure in pipe 84 is limited by spring 139, cylinder 115 acting like an expansion chamber or accumulator, and spring 118 of cylinder 112 should be made strong enough to keep piston 113 from moving under these circumstances. The car will now be moving forward in extreme low gear. Following this, the pressure builds up rapidly, forcing piston 113 rightwardly and increasing the transmission ratio up to its maximum or to a predetermined lower value. When piston 113 uncovers port 145 it also covers at the same time or earlier in its movement the pipe 127. Oil now flows through port 145 to speed reduction valve 119, thence to differential valve 143 (Fig. 3) where it acts on piston 150 moving it down and thus closing pipe 134 and opening pipe 144 and supplying oil under pressure to the end of brake actuating cylinder 115 where it acts on piston 151. This forces rod 152 leftwardly which operates bell-crank 153, fork 76 (Figs. 1, 3 and 5) and applies direct drive clutch 75. This picks up drum 35 and rotates it counterclockwise against the reaction of the load. Band 36 starts to rotate with it but this carries both pistons 137, 138 of the brake actuating cylinder leftwardly until the skirt of piston 138 uncovers pipe 114 whence the trapped oil between the two pistons flows out through valve 108, Fig. 2, to the sump. Excess oil pressure now forces piston 150 of the differential valve further down against pressure on bottom of valve 133 and against spring 167 until piston 150 uncovers pipe 95 whence the excess oil flows to the sump through reverse shift valve 90 and pipe 96, it being remembered that valve pistons 92, 93 are in the rightward position, with pipes 94 and 95 uncovered. The areas of piston 150 and valve 133, and the power of the spring 167 if used should be so proportioned as to give the necessary pressure to prevent slippage of clutch 75 but not to give an unnecessary overload, as the thrust from this clutch is taken continuously through relatively rotating parts. Valve 133, and piston 150 therefore act as a relief valve when driving the vehicle forward.

Suppose now that the operator having attained the desired car speed (in direct drive) or coming to a down grade, takes his foot off the accelerator button. This again opens starting valve 125 but nothing happens as a result of opening this valve since pipe 127 is closed by piston 113 of the control cylinder 112. Hence the engine may be used as a brake in direct drive. If the operator desires to coast, this may be accomplished by opening control valve 80. If he comes to an up-grade and desires to change down out of direct drive, he merely steps on button 120 which turns valve 119 counterclockwise thus connecting pipe 145 to the sump and relieving valve piston 150 of pressure which causes it to rise, thus connecting pipe 144 to the sump through pipe 95 and allowing the direct-drive clutch piston 151 to move rightwardly which releases clutch 75. The rise of piston 150 at the same time opens pipe 134 which results in applying brake band 36 to reaction drum 35. Until drum 35 stops rotating counterclockwise under the influence of clutch 75, band 36 does no more than keep close to drum 35 as the contact pressure is limited by spring 140 as piston 138 moves leftwardly, which in its leftward movement first closes port 135 thus preventing loss of pressure on remainder of control and then uncovers pipe 114 whence the oil tending to operate the band 36 through pipe 134 flows to the sump. As soon, however, as the load reaction on drum 35 causes it to move clockwise, the piston is moved rightwardly by spring 140, port 114 is shut off, and port 135 opened, thus full pressure develops and band 36 grips drum 35 tightly. Band 36 in ordinary forward operation therefore acts as a one-way clutch to prevent serious loss of pressure through 114 during this change, with a resulting tendency for the piston 113 to move leftwardly, and the transmission to change into low gear requiring excessive engine speed to reverse the rotation of drum 35, the port 136 in piston 138 moving out of register with port 135 before the piston opens 114 and keeping port 135 closed up to the time of the full opening of 114. With button 120 depressed, the transmission will stay out of direct drive but as soon as the operator removes his foot from the button, pressure is again supplied to differential valve 143 and the transmission goes into direct drive as before described.

It should be noted that button 120 may be fully depressed at any car speed without causing damage, noise (except that due to speeding of the engine), jerking of the car or other unpleasant action. If the car is already operating on the transmission, i. e., not up to direct drive, the movement of button 120 has no effect whatever. To make the transmission drive the engine at greater than 1:1 ratio, in order to provide the equivalent of low gear braking with the conventional transmission, brake control valve 108, Fig. 4 is turned clockwise. As explained hereinbefore, this movement of the valve first closes port 114, thus trapping in brake cylinder 115, Fig. 3, the oil by which the brake band was applied to drum 35, so that the band is held on the drum. The valve also disconnects pipe 94 from 110, so that no more oil can flow to control cylinder 112 except through the bleeder by-pass connection 105 around the valve. At the same time or slightly before disconnecting pipes 94 and 110 from each other, valve port 116 opens pipe 110 to the drain 109a, and by continued movement the valve can be opened far enough to pass to the drain all the oil in the control cylinder and also all the oil passed around the valve by the bleeder 105, thus permitting the control piston to recede (leftwardly in Fig. 2) to the extreme low speed-ratio position. Hence if the valve ports are suitably sized the operator can, by adjustment of the valve, vary the oil pressure on the control cylinder to any extent desired and thus vary the braking effect correspondingly.

As the pressure in cylinder 112 is reduced (the transmission being in direct drive) piston 113 moves leftwardly thus closing port 145 and eventually opening it to drain pipe 128. This action relieves the pressure on piston 150 of valve 143 which rises due to pressure from pipe 94 and oil is fed to cylinder 115 through 134. Since for braking the reaction on drum 35 is counter-clockwise, looking from the right in Fig. 1 the piston 137 first moves rightwardly contracting band 36 on drum 35, which moves band 36 leftwardly (Fig. 3) and with it pistons 137 and 138, but since relief port 114 is closed, the pistons continue their movement against spring 140 until pipe 134 is permanently uncovered by the skirt of piston 138. In the interim it will be noted that pipe 134 has been closed by the skirt of piston 136 but since there is no escape for the oil except leakage and the action is very quick, the pressure of the trapped oil is sufficient to continue the leftward movement of piston 138 until pipe 134 is permanently uncovered by the piston skirt. The motion then continues until tappet 155 or the cylindrical extension thereof strikes washer 156. The spring 157 is preset to give the desired braking torque on the drum 35 and to prevent an overload. As spring 157 deflects, piston 137 moves leftwardly until it comes to a stop over recess 158. This recess is wider than the piston so that as the piston uncovers the rightward edge of the recess it forms a relief for the oil from pipe 134, through drain 159. The pressure between pistons 137 and 138 is then maintained at just the right amount to balance the torque for which spring 157 is set, assuming of course that the maximum braking effort is being employed. In general the torque for which spring 157 is set is relatively small, since only engine friction is being used and even at the maximum ratio the reaction torque on drum 35 will probably not equal full engine torque. The braking effect may also depend upon the spring 118 of cylinder 112 particularly if a torque responsive principle of ratio control such as that disclosed herein and in my Patent No. 1,698,229 is used. The design of valve 108 may be varied considerably to suit conditions. For instance, it may be made to simply shut off relief port 114, the pressure being reduced by control valve 80 or the functions of 80 and 108 may be combined in one valve as may also those of 99, Fig. 6.

To reverse the direction of the car, the operator simply makes the shift as previously described and steps on the accelerator. This operates the clutch 75 through piston 151 to which oil under pressure flows from pipe 95 through valve 143 to pipe 144. Of course the car should be standing still when the shift is made.

To stop the car it is evident that all that is necessary is to release the accelerator button 129 and apply the brakes. As the vehicle speed decreases the pressure drops, piston 113 uncovers pipe 127 which releases the pressure in the system, clutch 75 and brake band 36 are released, and the car stops with the engine idling. With some types of ratio control the idling torque of the engine is not sufficient to bring the transmission back into low gear but this difficulty may be overcome by the operator depressing button 120 while coming to a stop which gives a slight additional throttle opening, as already described. This may also be obviated, of course, by setting valve 80 to give a somewhat higher idling speed than normal.

Referring to the direct drive feature, it will be observed that (disregarding the disabling valve 125) as the control piston 113, Fig. 2, moves rightwardly under the influence of pressure in cylinder 112, direct drive will be applied as soon as pipe 145 is opened and will remain in operation until the piston moves back (leftwardly) and again opens the pipe. Thus there is a certain range of movement of the piston within which the speed of the engine or of the driving element, and hence the fluid pressure in the control cylinder 112 may vary without causing the transmission mechanism to go out of direct drive. In general this range of piston movement is determined by the width of the opening through which oil enters pipe 145 and by the thickness of the piston. Also, the speed ratio at which the piston in its rightward movement opens pipe 145 depends, in general, other conditions being equal, upon the location of the point at which the pipe is connected to the cylinder. On the other hand, the engine speed (or speed of the driving disks) at which the said speed ratio is attained depends in part at least upon the setting of speed-control valve 80.

It is to be understood that the invention is not limited to the construction and combination herein specifically illustrated but that its various features can be embodied in other forms and combinations within the spirit and scope of the following claims.

Having thus described my invention, I claim:

1. In a variable speed friction transmission mechanism, in combination, a rotatable driving disk element, a driven roller element cooperating therewith, a reaction disk element cooperating with the roller element and tending to rotate in the direction reverse to the driving element, brake means adapted to restrain the reaction element from such reverse rotation and automatically releasable to permit rotation in the forward direction, and operator-operable means to prevent such automatic release of said brake means.

2. In a variable speed friction transmission mechanism, in combination, cooperating disks and rollers, constituting a rotatable driving element, a rotatable driven element, and a rotatable reaction element; automatic brake means for preventing rotation of the reaction element in the direction reverse to the rotation of the driving element, automatic releasing means to release said brake means to permit rotation of the reaction element in the same direction as the driving element, and means operable by the operator to prevent releasing operation of said automatic releasing means.

3. In a variable speed friction transmission mechanism, in combination, grooved disks and cooperating rollers, constituting a rotatable driving element, a rotatable driven element, and a rotatable reaction element; automatic fluid-pressure actuated brake means for preventing rotation of the reaction element in the direction reverse to the rotation of the driving element, automatic fluid pressure actuated releasing means to release said clutch means to permit rotation of the reaction element in the same direction as the driving element, and fluid-pressure control means operable by the operator to prevent releasing operation of said automatic releasing means.

4. In a variable speed friction transmission mechanism, a rotatable driving disk element, a driven roller element cooperating therewith and having rollers adjustable to vary the speed ratio of the mechanism, a reaction disk element cooperating with the roller element, fluid pressure means responsive to the speed of the driving element to adjust the rollers for change of speed ratio, and an operator-operable braking valve for controlling the relation between the speed of the driving element and the response of the roller-adjusting means thereto.

5. In a variable speed friction transmission mechanism, a rotatable driving disk element, an element having rollers cooperating with the driving disk element and mounted for adjustment to vary the speed ratio of the mechanism, a reaction disk element cooperating with said rollers, automatic brake means for restraining the reaction element from rotation in the direction reverse to the driving element, fluid-pressure means responsive to the speed of the driving element to adjust the rollers for change of speed-ratio, and a braking valve controlled by the operator for controlling the relation between the speed of the driving element and the response of the roller adjusting means thereto.

6. In a variable speed friction transmission mechanism, in combination, disks and cooperating rollers constituting driving, driven, and reaction elements, said rollers being adjustable to vary the speed-ratio of the mechanism; automatic brake means for preventing rotation of the reaction element in the direction reverse to the rotation of the driving element and releasable to permit forward rotation for direct drive, direct drive mechanism normally operating between predetermined upper and lower speeds of the driving element, means operable by the operator at will to disable the direct drive mechanism, and automatic means operable to adjust the rollers while the direct drive mechanism is disabled.

7. In a variable speed friction transmission mechanism, in combination, disks and cooperating rollers constituting driving, driven, and reaction elements, said rollers being adjustable to vary the speed-ratio of the mechanism; roller-adjusting means responsive to the speed of the driving element, automatic brake means responsive to the speed of the driving element to prevent rotation of the reaction element in the direction reverse to the rotation of the driving element and releasable to permit forward rotation for direct drive, direct drive mechanism normally operating between predetermined upper and lower speeds of the driving element, and means operable by the operator at will to disable the direct drive mechanism.

8. In a variable speed friction transmission mechanism, in combination, disks and cooperating rollers constituting driving, driven, and reaction elements, said rollers being adjustable to vary the speed-ratio of the mechanism, roller-adjusting means responsive to the speed of the driving element, automatic brake means for preventing rotation of the reaction element in the direction reverse to the rotation of the driving element and releasable to permit forward rotation for direct drive, fluid-pressure actuated direct drive mechanism normally operating between predetermined upper and lower speeds of the driving element, and means operable by the operator at will to control the actuating fluid-pressure independently of the speed of the driving element.

9. In a variable speed friction transmission mechanism, in combination, disks and cooperating rollers constituting driving, driven, and reaction elements, said rollers being adjustable to vary the speed-ratio of the mechanism; fluid-pressure actuated roller-adjusting means, fluid pressure actuated brake means for preventing rotation of the reaction element in the direction reverse to the rotation of the driving element and releasable to permit forward rotation, fluid-pressure actuated direct drive mechanism adapted for operation between predetermined upper and lower speeds of the driving element, means for supplying actuating fluid to said means and mechanism at a pressure corresponding to the speed of the driving element, and operator-operable means for controlling the supply of pressure fluid to the direct drive mechanism independently of the speed of the driving element.

10. In a variable speed friction transmission mechanism, in combination, disks and cooperating rollers for driving a load from an engine in the forward direction at fractional speed ratios, automatic direct drive means normally operating between predetermined upper and lower speeds of the engine to drive the load in the forward direction at unity ratio, and means operable at will to disable the direct drive means and enable forward drive to be maintained between the said upper and lower speeds of the engine.

11. In a variable speed friction transmission mechanism, in combination, a driving disk element, a planetary roller element cooperating therewith, a driven disk element cooperating with the planetary roller element, a driven member, a non-rotatable member, operator-controlled shifting means for connecting the planetary roller element with the driven member or with the non-rotatable member at will, and means operable to drive the driven member from the driven disk element.

12. In a variable speed friction transmission mechanism, in combination, a driving disk element, a planetary roller element cooperating therewith, a driven disk element cooperating with the planetary roller element, a non-rotatable member, a driven member, operator-controlled shifting means for connecting the planetary roller element with the driven member or with the non-rotatable member at will, automatic means for preventing rotation of the driven disk element when the planetary roller element is connected with the driven member, and automatic means for driving the driven member from the driven disk element when the planetary roller element is connected with the non-rotatable member.

13. In a variable speed friction transmission mechanism, in combination, a driving disk element, a planetary roller element cooperating therewith, a driven disk element cooperating with the planetary roller element; a driven member, means for connecting and disconnecting the planetary roller element and the driven member; fluid-pressure mechanism for actuating said means, comprising a cylinder, a piston movable therein and connected with said means, fluid-pressure supply means connected with said cylinder, and operator-operated means for controlling the supply of fluid to said cylinder; means operable after disconnection of the planetary roller element and driven member to connect the latter with the driven disk element for rotation thereby; and automatic means then operating to prevent revolution of the planetary roller element when the latter is disconnected from the driven member.

14. In a variable speed friction transmission mechanism, in combination, a driving disk element, a planetary roller element cooperating therewith, a driven disk element cooperating with the planetary roller element, a driven member; means for connecting the driven member with the planetary roller element or with the driven disk element; fluid-pressure actuated mechanism to actuate said connecting means, comprising a cylinder, a piston movable therein and connected with said connecting means, a source of fluid under pressure, and an operator-operated valve between the cylinder and said supply to deliver fluid to either end of the cylinder at will and permit escape of fluid from the other end; and means to prevent revolution of the planetary roller element when the driven member is connected with the driven disk element and to prevent rotation of the latter when the driven member is connected with the planetary roller element.

15. In a variable speed friction transmission mechanism, in combination, a driving disk element, a planetary roller element cooperating therewith, a driven disk element cooperating with the planetary roller element, a driven member, a non-rotatable member, an operator-actuated shift rod for connecting the planetary roller element with the driven member or with the non-rotatable member at will, and means operable to drive the driven member from the driven disk element.

16. In a variable speed friction transmission mechanism, in combination, friction disks and cooperating rollers constituting driving and driven elements, a driven member, fluid-pressure actuated means for operatively connecting the driven member with the driven element for actuation thereby, a source of fluid under pressure connected with said fluid-pressure actuated connecting means, fluid pressure control means predetermining the pressure at which said connecting means is actuated, and means normally preventing actuation of said connecting means at the predetermined pressure but operable by the operator to cause such actuation.

17. In a variable speed friction transmission mechanism, in combination, friction disks and cooperating rollers constituting driving and driven elements, a driven member, fluid-pressure actuated means for operatively connecting the driven member with the driven element for actuation thereby, a source of power to drive the transmission mechanism, operator-operated means for controlling said source of power, a source of fluid under pressure connected with said fluid-pressure actuated connecting means, and means adapted to prevent actuation of said connecting means and associated with the operator-operated power-control means for operation thereby to cause actuation of said connecting means.

18. In a variable speed friction transmission mechanism, in combination, friction disks and cooperating rollers constituting driving and driven elements, a driven member, mechanism adapted to be actuated to operatively connect the driven member with the driven element for actuation thereby, a source of power for driving the transmission mechanism, operator-operated means for controlling the source of power, means normally preventing actuation of said connecting means and operable to cause actuation thereof, and a connection between the last mentioned means and the power controlling means to operate the former when the latter is operated.

19. In a variable speed friction transmission mechanism, in combination, power means for driving the transmission mechanism, fluid-pressure mechanism for controlling the transmission mechanism, a pressure relief valve operable to prevent or to cause operation of the fluid-pressure mechanism, means for controlling said power means, and operator-operated actuating means common to the relief valve and the power controlling means.

20. In a variable speed transmission mechanism, in combination, power means for driving the transmission mechanism, fluid-pressure mechanism for controlling the transmission mechanism and having a speed-ratio control member, a pressure-relief valve operable to prevent or cause operation of the fluid-pressure mechanism, means for controlling said power means, operator-operated actuating means common to the relief valve and the power controlling means, and pressure relieving means in series with the said pressure-relief valve and operating at a predetermined position of the speed-ratio control member.

21. In a variable speed friction transmission mechanism, in combination, power means for driving the transmission mechanism, controlling means for the power means, fluid-pressure actuated mechanism for controlling the transmission mechanism, a fluid-pressure relief valve adapted when open to prevent operation of the fluid-pressure actuated control mechanism, operator-operated means connected with the relief valve to produce closing movement thereof, and a connection between the operator-operated means and the power control to actuate the latter after closing movement of the relief valve.

22. In a variable speed friction transmission mechanism, in combination, an engine for driving the transmission mechanism, a throttle to control the speed of the engine, fluid-pressure actuated means to control the transmission mechanism, a fluid-pressure relief valve associated with the fluid-pressure actuated control mechanism, and operator-operated means for actuating the engine throttle, connected with the relief valve to close the same before opening the throttle and to open the same after closing the throttle.

23. In a variable speed friction transmission mechanism, in combination, fluid-pressure means for controlling the transmission mechanism, operator-operated pressure-relief means for the fluid-pressure means, and automatic means in series with said operator-operated means to permit pressure relief thereby only within a predetermined speed-ratio range.

24. In a variable speed friction transmission mechanism, in combination, friction disks and cooperating rollers constituting driving and driven elements, a driven member, fluid-pressure actuated means for operatively connecting the driven member with the driven element for actuation thereby, yielding means associated with said means to insure smooth starting of the driven member, a source of fluid under pressure connected with said fluid-pressure actuated connecting means, and fluid pressure control means predetermining the speed of the driving member at which said connecting means is actuated.

25. In a variable speed friction transmission mechanism, in combination, friction disks and cooperating rollers constituting driving, driven and reaction elements, fluid-pressure actuated means operable to arrest the reaction element while rotating and prevent further rotation thereof, and yielding means associated with said arresting means to cause smooth arrest of the reaction element.

26. In a variable speed friction transmission mechanism, in combination, a rotatable driving disk element, a driven roller element cooperating therewith, a reaction disk element cooperating with the roller element and tending to rotate in the same direction as the driving element under the reaction of the driven element, and brake means adapted to restrain the reaction element from forward rotation and automatically releasable under overload on the driven element to permit such rotation.

27. In a variable speed friction transmission mechanism, in combination, cooperating disks and rollers, constituting a driving element, a driven element, and a reaction element; a member driven by the driven element, brake means operable to prevent rotation of the reaction element in the forward direction, and yielding means to relieve said brake means on overload.

28. In a variable speed friction transmission mechanism, in combination, cooperating disks and rollers constituting a driving element, a driven element, and a reaction element; a driven member, means to connect the driven member with the driven element or the reaction element for actuation by either at will, means operable to prevent rotation of the reaction element when the driven member is connected with the driven element, means preventing rotation of the driven element when the driven member is connected with the reaction element, fluid-pressure actuated means to operate the first mentioned means, and operator-operated means (valve 99) to control the fluid-pressure actuated means.

29. In a variable speed friction transmission mechanism, in combination, cooperating disks and rollers constituting a driving element, and driven elements rotatable in opposite directions by the driving element; a driven member; fluid-pressure actuated means to connect the driven member with either driven element at will, having a fluid-pressure cylinder and a piston movable therein; a source of fluid pressure, and an operator-operated valve (99) between the cylinder and the source of fluid pressure to admit fluid under pressure to either end of the piston and discharge fluid from the other end.

30. In a variable speed friction transmission mechanism, in combination, cooperating friction disks and rollers constituting driving and driven elements, a driven member, means for driving the driven member from a driven element at automatically variable fractional speed ratios, direct-drive means operable to drive the driven member at unity speed ratio, means operable at will to prevent operation of the direct-drive means, and automatic means for adjusting the rollers to vary the speed ratio while the direct drive means is prevented from operating.

31. In a variable speed friction transmission mechanism, in combination, cooperating friction disks and rollers constituting driving and driven elements, means for driving the driving element at variable speed, a driven member, means for actuating the driven member from a driven element when the speed of the driving element is at a predetermined value, and means normally preventing actuation of the driven member at the predetermined driving element speed but operable at will to permit such actuation.

32. In a variable speed friction transmission mechanism, in combination, cooperating disks and rollers, an engine connected with the transmission mechanism to drive the same and provided with a throttle, means for opening the throttle, a driven member, means for driving the driven member from the disks and rollers at a fractional speed ratio, direct drive means operable to drive the driven member from the disks and rollers at unity speed ratio, means operable to disable the direct drive means, and operator-operable actuating means common to said disabling means and said throttle-opening means.

FRANK A. HAYES.